W. & J. N. JONES.
CORN-PLANTER.
No. 182,448. Patented Sept. 19, 1876.
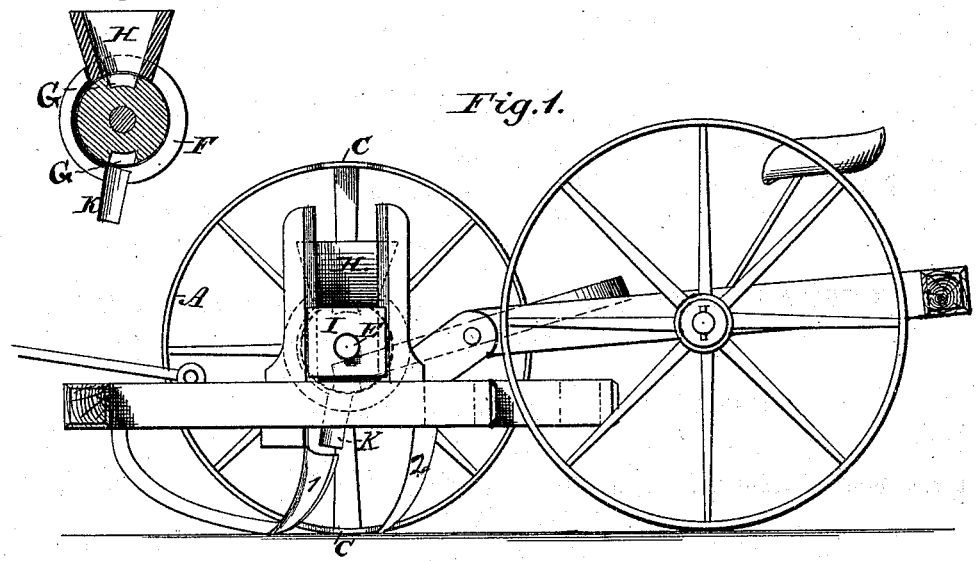
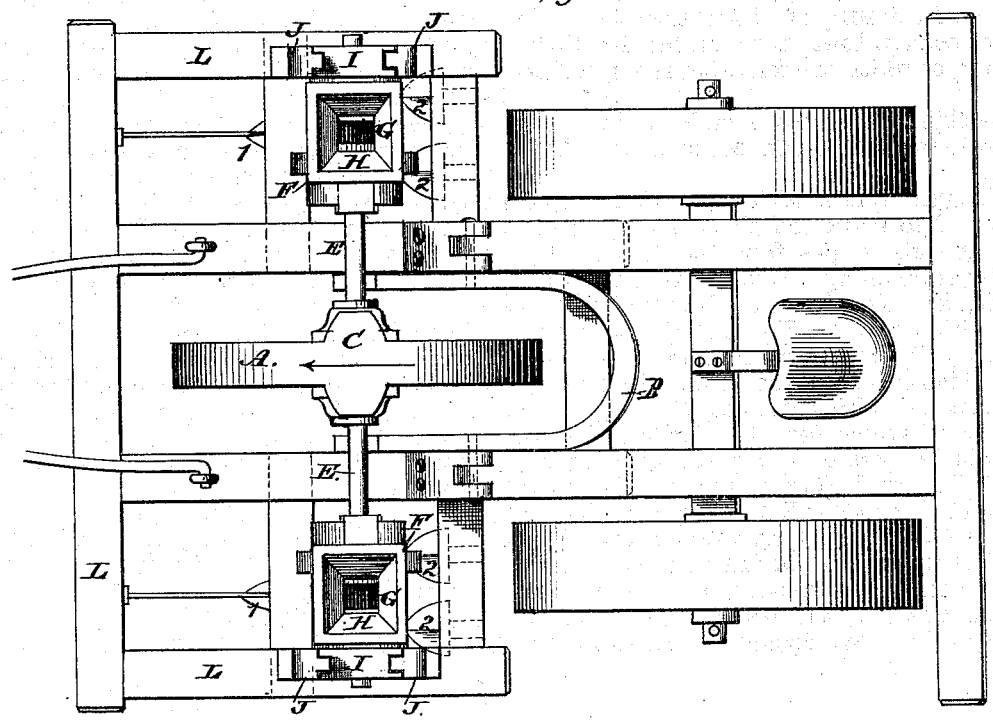
Witnesses:
John W. Cole,
John Henderson,
Inventors:
William Jones,
Jasper N. Jones.

UNITED STATES PATENT OFFICE.

WILLIAM JONES AND JASPER N. JONES, OF UNION TOWNSHIP, VAN BUREN COUNTY, IOWA.

IMPROVEMENT IN CORN-PLANTERS.

Specification forming part of Letters Patent No. 182,448, dated September 19, 1876; application filed May 11, 1874.

*To all whom it may concern:*

Be it known that we, WILLIAM JONES and JASPER N. JONES, of Union township, Van Buren county, Iowa, have invented a Corn-Planter, of which the following is a specification:

The object of our invention is to plant corn in rows, so that it can be cultivated both ways.

A, Figure 1, is a wheel, with wide projections C C to mark the place of dropping in rows at right angles from the direction the planter is traveling. Wheel A revolves shaft E. Shaft E, Fig. 1, has on both ends rollers F F, with cups G G, Fig. 3, in line with projections C C, that drop the corn at the time projections C C mark the rows. Rollers F F are provided with set-slides, that gage the number of grains per hill. Rollers F F revolve in hoppers H H, Fig. 1, that carry the corn. Hoppers H H are attached to blocks I I, Fig. 1, in which shaft E has bearings. Blocks I I travel in ways J J, Fig. 2, allowing wheel A and shaft E to rise or fall, as the case may be, in passing over rough or uneven ground, without affecting the rest of the machine. Hoppers H H have spouts K K attached underneath, that carry the corn in rear of shovels 1 1. Shovels 2 2 2 2 cover the corn. Shovels 1 1 and 2 2 2 2 are provided with cutters to keep them from choking. Lever B, Fig. 2, rests under shaft E, to raise wheel A, so that it can be turned to correct any error that may have been made in the rows in rough or uneven ground, and also to prevent the dropping of corn at any desired time. Lever B, ways J J, and shovels 1 1 and 2 2 2 2 are attached to frame L, Fig. 2. Frame L is pivoted to a main frame, that is supported by two wheels, and has a seat for the person that operates the machine.

We claim as our invention—

The combination, in a check-row planter, with the pivoted runner-frame L, of marker-wheel A, shaft E, carrying the seed-cylinders G, adjustable hoppers H, guides J, and lever-frame B, substantially as and for the purpose set forth.

WILLIAM JONES.
JASPER N. JONES.

Witnesses:
ELIZA J. FULLER,
CHARLES E. FULLER.